United States Patent [19]
Clowes et al.

[11] Patent Number: 5,633,999
[45] Date of Patent: May 27, 1997

[54] WORKSTATION-IMPLEMENTED DATA STORAGE RE-ROUTING FOR SERVER FAULT-TOLERANCE ON COMPUTER NETWORKS

[75] Inventors: Richard F. Clowes, New York; Fred W. Tims, Springfield Center, both of N.Y.

[73] Assignee: Nonstop Networks Limited, New York, N.Y.

[21] Appl. No.: 573,865

[22] Filed: Dec. 18, 1995

Related U.S. Application Data

[63] Continuation of Ser. No. 230,098, Apr. 20, 1994, abandoned, which is a continuation-in-part of Ser. No. 90,991, Jul. 13, 1993, which is a continuation of Ser. No. 610,181, Nov. 7, 1990, abandoned, and a continuation-in-part of Ser. No. 44,323, Apr. 7, 1993.

[51] Int. Cl.⁶ ............................................ G06F 11/00
[52] U.S. Cl. ............................ 395/182.04; 395/183.16
[58] Field of Search ........................ 395/182.04, 183.16

[56] References Cited

U.S. PATENT DOCUMENTS 5,239,659  8/1993  Rudeseal et al. ................. 395/800
5,428,796  6/1995  Iskiyan et al. .
5,461,720  10/1995  Beardsley et al. .
5,504,873  4/1996  Martin et al. .

OTHER PUBLICATIONS

*Personal Systems*, Jul. 1992 pp. 1–12.
*Computer Architecture and Organization*, Second Edition by John P. Hayes ©1988 by McGraw-Hill, Inc. pp. 664–666.

*Primary Examiner*—Vincent P. Canney
*Attorney, Agent, or Firm*—Handal & Morofsky

[57] ABSTRACT

Server fault tolerance on local area computer networks is provided by novel workstation implemented software which detects failure of a primary file server and reroutes data storage activity routed via the primary file server, to be routed via an invention-provided secondary file server. Shared file management of multiple file servers or intelligent hosts supporting a single or common high availability data storage system, for example a RAID drive, enables server or host fault tolerance to be provided for such a single highly, reliable data-storage system. Cross-mirroring in such a multi-host, high availability data storage system, along with secondary write suppression, enables server fault tolerance to be provided without significant redundant hardware costs and without a single point of failure in the data storage access paths.

20 Claims, 2 Drawing Sheets

WORKSTATION-IMPLEMENTED DATA STORAGE RE-ROUTING FOR SERVER FAULT-TOLERANCE ON COMPUTER NETWORKS

CROSS REFERENCES TO RELATED APPLICATIONS

This application is a continuation of application Ser. No. 08/230,098, filed 20 Apr. 1994, now abandoned, which was a continuation-in-part of Tims et al. patent application Ser. No. 08/090,991 filed Jul. 13, 1993 which in turn is a continuation of application Ser. No. 07/610,181 filed Nov. 7, 1990, (the parent application), now abandoned, the disclosure of which is hereby incorporated herein by reference thereto, and is a continuation-in-part of Tims et al. application Ser. No. 08/044,323 filed Apr. 7, 1993, the disclosure of which is also hereby incorporated herein by reference thereto.

TECHNICAL BACKGROUND

This invention relates to fault-tolerant computer networks in which multiple users can write data to a shared random access data storage device. Typically, multiple shared data sets in the form of shared files are stored on one or more storage devices or logical drives attached to a network server computer providing random access to the shared data sets. In a common configuration, a high-performance network file server computer supports either a wired or wireless network of intelligent workstations by means of which users can communicate, one with another and share network services, for examples high capacity storage devices, drives or drive systems, where shared network data is stored for use by workstation users.

More particularly, the invention relates to computer systems having what has been described as level three fault tolerance. Level three fault tolerance is usually definable as including means enabling users to continue to access and process shared data after the failure of an intelligent host, or file server, supporting access to a storage device holding the shared data. For effective commercial operation, for example, to keep bank tellers in business, and for most practical purposes, the shared data must continue to be available in a substantially automatic manner, after a server failure, without any need to reconnect or to restore any hardware, and with no or minimal user or supervisor intervention being required to permit processing to continue.

BACKGROUND OF THE INVENTION

Data Duplication

Conventional approaches to the problem of providing continuity of data access to networked, file-sharing computer users regardless of hardware failure, rely upon generation of a duplicate version of the shared data which is to be employed when the primary data set becomes unavailable. Loss-of-power problems are overcome by uninterruptible power supply (UPS) technologies and are not the province of the present invention. Known UPS systems can switch to a standby power source without loss of data.

A common practice for duplicating data is the use of a tape or other sequential storage backup device to generate the duplicate data set. After failure to access a particular random access data storage device on the network, a new data image is generated on another random access storage device by restoring the data from tape. Usually, while this is effected, network processing must be suspended for hours or perhaps days. This is a serious problem forcing network users to resort to manual operations or suspend their business or other computer activities.

A further problem is that tape backup, being periodic and sequential, cannot provide a complete, fully synchronized, up-to-date, duplicate image of the primary data and requires dedicated equipment that makes no contribution to productive network processing duties. Compounding the time-related inefficiencies of tape backup, is the expense of such necessary backup equipment.

Data Synchronism

Exact data synchronism is a fundamental requirement of fault tolerant solutions relying upon real time maintenance of a duplicated data image. The existence of a data discrepancy between primary and secondary data images, or any significant uncertainty as to the content of the duplicated data image, imperils the value of the data and of the fault-tolerant technology employed to create a duplicate data image.

In many environments, expense is secondary to network reliability. The cost of suspending network activity can be so high that even major investments in system redundancy to reduce down time, are fully justified. Retail and sales order businesses may lose thousands of dollars an hour when networks of tens or hundreds of sales-processing workstations are out of service. Other so-called "mission-critical" systems such as defense systems, production lines, space systems, and advanced science or engineering projects may be so sensitive to any interruption of network activity that extraordinary means for ensuring the availability of shared data to network users are readily justified.

Levels of data-access fault tolerance

Customarily, data-access fault tolerance is classified into three levels according to the nature of the failure that can be tolerated without loss of data availability.

Level one fault tolerance relates to tolerance of storage medium failures, bad disk surfaces, for example.

Level two fault tolerance relates additionally to tolerance of failures of storage device sub-systems and storage device-to-host computer cabling failures.

Level three fault tolerance relates additionally to tolerance of host computer failures and, in some network situations where the host computer is a file server, to tolerance of workstation to file server cabling failures. In a typical client-server network situation a file server is host to a data storage system accessed by multiple client workstations.

Level three fault tolerance on such a computer network, providing the ability, inter alia, to survive the failure of the storage device, of its sub-systems, of relevant cabling or of the file server itself, can be conveniently referenced as "server fault tolerance", and will be so referenced herein.

Major et al. U.S. Pat. No. 5,157,663

U.S. Pat. No. 5,157,663 (Drew Major et al.) assigned to Novell, Inc. describes means for providing server fault tolerance on a computer network, by coupling a passive secondary or backup file server to a primary file server through a physical, network-independent server-to-server link in the form of a high-speed data bus connected directly between the two servers. The server link is separate from and independent of conventional network traffic pathways.

Digitized signals on the server-to-server link are not available to or carried to other stations or nodes on the network whereas conventional network traffic is available to every station on the network, or network hub. Until the primary fails and the secondary takes over network processing duties, the secondary server makes no contribution to network processing duties. The secondary server is thus a redundant hardware unit dedicated to fault tolerance (as is the server-to-server link) which can be described as "passive", in contrast to the "active" primary server which is busy managing network traffic and shared access to a random access data storage device.

In addition, a significant proportion of the primary server's resources are dedicated to supporting the server-to-server link, and are therefore unavailable for productive network processing. This support can constitute a fault-tolerance overhead as high as 15 to 40% of the server's processing capacity.

A typical or, in known commercial embodiments of the Major et al. invention, a required configuration comprises performance-matched primary and secondary servers and a separate high capacity random access data storage system supported by each server. Major's physical server-linking bus, and associated software, keeps the secondary server in data synchrony with the primary and enables the secondary continuously to monitor the condition of the primary.

In the Major et al. fault-tolerant computer network system, duplicate data images are maintained on separate storage drives each supported by its own file server. Loss of data availability to the work stations on routes to the primary server is detected by the secondary server which then takes over network processing and data access maintenance responsibilities. While this system of networked redundant servers can provide some server fault tolerance, it has drawbacks. The server-to-server bus is a complex physical system potentially subject to failure and possibly constituting a single point of failure. Commercially, the Major et al fault tolerant system is expensive to purchase for many operators, especially for small networks with few workstations. Additionally, in some situations, the Major et al. system is susceptible to loss of data entrusted to the network by a workstation. It is also unable to function in a number of important network operating environments and is vulnerable to faulty server software and hardware.

Thus, the Major et al. system, as commercially available in early 1994, is limited with regard to the network operating systems it supports, specifically supporting only Novell's NETWARE® v. 3.11 with support for other Novell systems, including the newest version of NETWARE®, version 4.xx, being promised only for future delivery. Accordingly, pioneering users accustomed to purchasing the best-available technology, and who have migrated to NETWARE® version 4.xx, are unable to obtain the benefits of server fault tolerance by way of the Major et al systems.

The extent of the required file server performance matching of the Major et al system is that the redundant passive server must be identical to the primary active server with regard to processor, RAM size, speed, content and configuration, for example with regard to I/O and caching buffers, and operating systems. While the passive secondary server may provide limited special-purpose functionality, for example print or communications services, it cannot be utilized for productive network read-write processing, until the primary active server has failed. Hence, a prospective customer for server fault tolerance, needing a secondary server, must either match their existing primary server, often a difficult proposition in the fast-changing computer hardware marketplace, or purchase two substantially matched new servers, making an expensive investment in a passive standby server that is substantially unproductive prior to failure of the primary.

A still further drawback of the Major et al linked server concept for providing fault tolerance on a computer network is that the dedicated link between servers, with its associated controllers, constitutes additional hardware which can fail, thus lowering the overall system mean time between failures (MTBF).

In addition, primary server malfunctions, for example, dropped bits in the data buffer, can be duplicated to the secondary, causing corruption of both primary and secondary data images. In this event, the primary constitutes a single point of failure in the system.

Also, there is a theoretical possibility that a data packet could be accepted and acknowledged by the primary and therefore, by design, be rejected by the secondary. If, in passing off to the secondary via the mirrored server link, the mirrored server link fails, the packet (update) will be lost. Here, the mirrored server link constitutes a single point of failure.

Still referring to the Major et al. disclosure, because of processing delays, uncertainty may arise as to the fate of a data packet sent to storage, at the time the primary goes down, especially if it reaches the secondary before the secondary learns of failure of the primary and takes over responsibility. Again, the primary may constitute a single point of failure.

In such directly linked server systems, if faulty, bug- or virus-ridden or otherwise ill-behaved software on the primary server should corrupt data, the corruption will migrate to the secondary server. Here, the primary server software constitutes a single point of failure.

In summary, Major et al. imposes additional unproductive activity on the primary server which is already a principal bottleneck on many networks, and entrusts control of the fault-tolerant service to a single component whose failure could imperil availability of both data images.

Clearly, there are numerous practical and theoretical shortcomings to providing network fault tolerance by means of a dedicated link between an actively processing, primary file server and a passive standby file server, in the manner disclosed by Major et al.

Fault Tolerance Requirements on a Network

A satisfactory fault tolerant network must safely store and maintain availability of all data entrusted to the network by each workstation user's application. Before data leaves a workstation, local catastrophes are manageable. After a workstation failure, the user can and should know precisely which data elements were stored successfully, and which were not. Any doubt can usually readily be removed by reconciling external information, such as physical records at the station, with the network files. If necessary another, or backup, workstation can be used to make the comparison. Only one station is involved even if the local event is fatal to the workstation. Other users are unaffected.

Once a data element joins the network, any failure to store it at the designated network location, or any uncertainty as to the fate of the data element, compromises the integrity of the data set, affecting all other users of that data set, or jeopardizing their confidence in the integrity of the data set. Especially, for example, in banking or other accounting environments, loss of a single data element, such as one transaction, may render a whole family of account files of doubtful value.

Disclosure of the parent application Tims et al. Ser. No. 07/610,581

Server fault tolerance data-loss prevention software, and server fault tolerant computer networks, as disclosed in Tims et al., employ a quite different philosophical approach to the problem of providing fault tolerance on computer networks.

The Tims et al. concepts recognize that control of intelligent network processing lies with the client workstations while a file server is little more than a sophisticated, but servile, traffic manager. Thus, it is at the workstation that data is generated and modified. It is at the workstation that a human user interacts with the network to achieve productive ends. Human interaction with the file server relates primarily to establishing and maintaining desired network mechanics. In keeping with this philosophy, Tims et al. provide a software-only system which effects duplicate data image creation to provide server fault tolerance under control of the workstation, not from the server, thereby avoiding logistical and workload problems that arise from server-oriented data duplication systems. The Tims et al. workstation-driven system is an economical approach to achieving network server fault tolerance that also ensures data synchronism and does not require a dedicated, physical server-to-server link. Both the control of and the workload associated with fault tolerance are distributed to the workstations, not centralized on the primary server.

In a preferred embodiment of the parent Tims et al. invention, a data "write" request (or other data-storage request affecting data accessibility or readability) directed to an address where a primary data set is stored, is intercepted by data loss prevention software loaded in each client workstation's RAM and replicated to a second address where a functionally identical data set is maintained on a second network drive supported by a second network file server.

The data loss prevention software monitors drive request returns and in the event of a "bad" return causing the workstation to be unable for any reason to access the primary data set, the data loss prevention software, transparently to the workstation user, will redirect processing to the secondary network address where the secondary data set is stored. This enables processing to continue in an uninterrupted manner, despite failure of the primary server or storage device. Subsequent "writes" and "reads" are directed to the secondary address, even though an application running at the workstation may have specified the address of the primary server, by relabeling and rerouting such writes and reads. By running the software at all relevant workstations, data synchronism is maintained.

More than twelve months prior to the filing date of the present application in 1994, Nonstop Networks Limited, assignees of the present invention, distributed product manufactured in accordance with the teaching of the invention disclosed in the parent application Ser. No. 07/610,181 and published in UK Patent Application GB 2,251,502 A (GB '502), on Jul. 8, 1992.

In preferred embodiments of the software and system of the parent application, a multiplicity of workstations on a network are connected to both a primary server and to a backup secondary file server by means of standard network cabling, such as twisted pair, coaxial, fiber optic, or equivalent and a network interface for example, an Ethernet®board, or the like. Because loss of data availability is detected individually by each relevant workstation, as it attempts to access a failed drive, and dataimage maintenance is driven by the workstations, there is no need for any added server-to-server communication across the network; no network-independent dedicated bus connection between the file servers is required; and there need be no processing overhead on the primary.

Commercial embodiments of the Tims et al invention provide important additional economic benefits not attainable by Major et al. In addition to a low initial investment, a particular economic advantage is that the secondary server need not match the performance characteristics of the primary. The secondary may be an older and slower machine and yet have no or nominal impact upon the primary server's network traffic throughput. Thus, a network can be upgraded to a new, more powerful server and, employing the Tims et al, invention, use the old server in providing fault tolerance. The Tims et al. disclosures provide an efficient, low cost and robust means of equipping a computer network with server fault tolerance.

In providing these and other valuable advantages, the Tims et al, invention embodies principles that can provide still further benefits, as will be elaborated in describing the invention disclosed herein.

While it is an extremely advantageous system as compared to previously known systems, a server fault tolerant network equipped with dual servers mirrored from the workstations, pursuant to Tims et al. nevertheless suffers the drawback of dedicating some hardware resources, notably the secondary file server, to fault tolerance. The investment in the secondary is substantially idle and unproductive until the primary server fails and network processing switches smoothly over to continue on the secondary server. One general problem suffered by known server fault tolerance solutions is that of requiring redundant hardware.

Detecting and responding to primary failure

Another problem encountered in providing server fault tolerance on a computer network is that of detecting failure of the primary server and switching processing to the secondary, without loss of any data entrusted to the network by its workstations. To avoid loss of workstation-generated data entrusted to server-hosted network data storage systems, it is important that data elements dispatched for storage after primary server failure are properly handled and stored by the secondary.

It is also important that the transfer of responsibility from primary to secondary server occurs promptly and avoids sending a next succeeding data element to the primary after failure thereof. Major et al, approached this problem by having the secondary server monitor all primary activity over a dedicated link. Many drawbacks of this approach were discussed above. An inherent difficulty is that the secondary server-dedicated link monitoring system is at the mercy of network traffic and has to be quick and responsive enough to monitor and responsibly handle every network data packet received while accommodating the unpredictability of a failure that may occur at the most inconvenient of times, for example, during execution of a data write.

BRIEF SUMMARY OF THE INVENTION

Server fault tolerance without redundant hardware

In one aspect, this invention solves the problem of providing server fault tolerance on a computer network without needing redundant server hardware.

According to this aspect of the invention, the problem is solved in a new computer network management method which employs on a computer network, a data storage device capable of being supported by multiple intelligent hosts. The method comprises:

a) coupling at least a primary and a secondary file server to said storage device for access by one or more workstations; and b) employing workstation loaded routing software said routing software performing the functions of:

i) routing all workstation generated network data storage activity destined for said storage device to be segregated between first and second file categories for storage on said storage device through said primary and said secondary file servers respectively whereby, said file servers share data storage activities providing network access to said data storage device;

ii) monitoring means to monitor data storage activities output from said workstation onto said computer network and to detect failure to access said high-availability storage device via a respective one of said intelligent hosts and iii) rerouting data access requests for said high-availability storage device via a respective other of said intelligent hosts hosting said data storage device in response to said access failure detection;

whereby workstation access to said high-availability storage device can continue transparently to the user despite failure of one of said intelligent hosts.

File segregation may be by any desired parameter providing a clearly defined separation of activity, for example, by workstation or by application. Surprisingly, a single large file, for example a database, such as a customer account list, can be shared by segregated groups of workstation users some of whom access the database through one file server and some of whom access it through the other. In such a case of a shared file, certain access locking measures are desirable, as will be described herein.

Stated differently, we have discovered that, in a preferred embodiment of the invention, simple and effective server fault tolerance can be provided by physically connecting both file servers to the same high-availability, random-access, data-storage device to support access of multiple workstation users, and by providing each user with software loaded at each and every workstation which software is responsive to loss of activity of either active file server to redirect data-related communication of said users with said commonly supported high-availability random-access data-storage device to be supported by the remaining active file server.

For economic efficiency, the prior solutions to providing server fault-tolerance on a computer network, as described hereinabove, tend to rely on a premise, which used to be largely true, that file servers are relatively more expensive and more reliable than data storage devices. Surprisingly, we have discovered that by employing newer high-availability data-storage systems having, for example, reliabilities at least three times better than a supporting file server, new configurations of server fault tolerant networks can be provided, offering a combination of economy and performance not heretofore obtainable.

Thus, to this end, the data storage device is preferably a high availability storage device, for example a multi-host supportable RAID drive, "RAID" being an acronym for "redundant array of inexpensive drives".

Prior server fault tolerant solutions for computer networks have required a passive backup storage device and a passive backup server to support network data storage activity in the event of failure of a primary active server. The passive backup storage device and server are redundant hardware dedicated to fault tolerance and represent idle resources under some operating conditions.

This invention requires no such idle resources. The network processing load can be divided so that part of the load is carried by the primary file server and part is carried by the secondary. If a file server fails, the full processing load is carried by a surviving file server, albeit with some loss of speed if the traffic load remains unchanged. Preferably, the network processing load is divided so that shared files are separately accessed via one server or the other, but not by both. If access to a shared file is required through both servers, perhaps because all network users need to access say a customer file, provision must be made for lock table integrity, so that either server can determine the access status of any file by any specified user.

Thus, the invention enables the cost of server fault tolerance to be reduced still further than is achieved by the economical software solution according to Tims et al. Any need for a redundant file server is avoided and an important preferred embodiment provides the remarkable possibility of enabling a backup server to be active and a productive participant in executing data processing functions on the network.

The problem of also providing storage device fault tolerance, in addition to server fault tolerance, is solved by employing a high availability storage device, for example a RAID drive. Known commercial high-availability data storage devices have a remarkably high reliability, with a mean time between failures well in excess of that of a typical file server. Many networks use such a high availability storage device as the principal data storage system for multiple users, which can be hundreds or thousands of users.

While multi-host support capability has recently been provided, nevertheless, it is unconventional to connect multiple computer hosts to support a single data-storage device. It is the day-to-day norm for computer professionals to work with equipment in which multiple storage devices are supported by a single computer or central processor system.
Detection of loss of data access It is a further object of the invention as disclosed in the parent Tims et al application to solve the problems of detecting and managing server failure on a server fault tolerant network provided with multiple file servers, in a manner providing control of network traffic after loss of data access via the primary server and avoiding need for a dedicated hardware link between the servers.

To solve this problem, the invention provides, in another aspect, rerouting software which runs at the workstations, monitors all data output by the workstation to a primary server-supported network data storage system maintaining a data image, detects failure to access said data storage system via said primary server and reroutes workstation-generated data storage activity to a current version of said data image via an alternative storage system access path. Detection of loss of access can be effected by monitoring returns from the storage system to the workstation, for example good or bad returns from drive write requests. A storage system access request can be held in workstation RAM, and rerouted in response to a bad return. Preferably, the rerouting software runs at all workstations using a particular shared data set and effects similar data storage routing at each, thus ensuring the integrity of the relevant data image version regardless of the access route.

After a primary server route failure, each workstation in turn will receive a bad return as it attempts to use the primary server access route, to which bad return the rerouting software running at the workstation can respond by relabeling or readdressing the storage system request via the alternative storage system access path.

BRIEF DESCRIPTION OF THE DRAWINGS

Some embodiments of the invention will now be described, by way of example with reference to the accompanying drawings, in which.

DETAILED DESCRIPTION OF THE PREFERRED EMBODIMENTS

Some concepts

Figure 1:
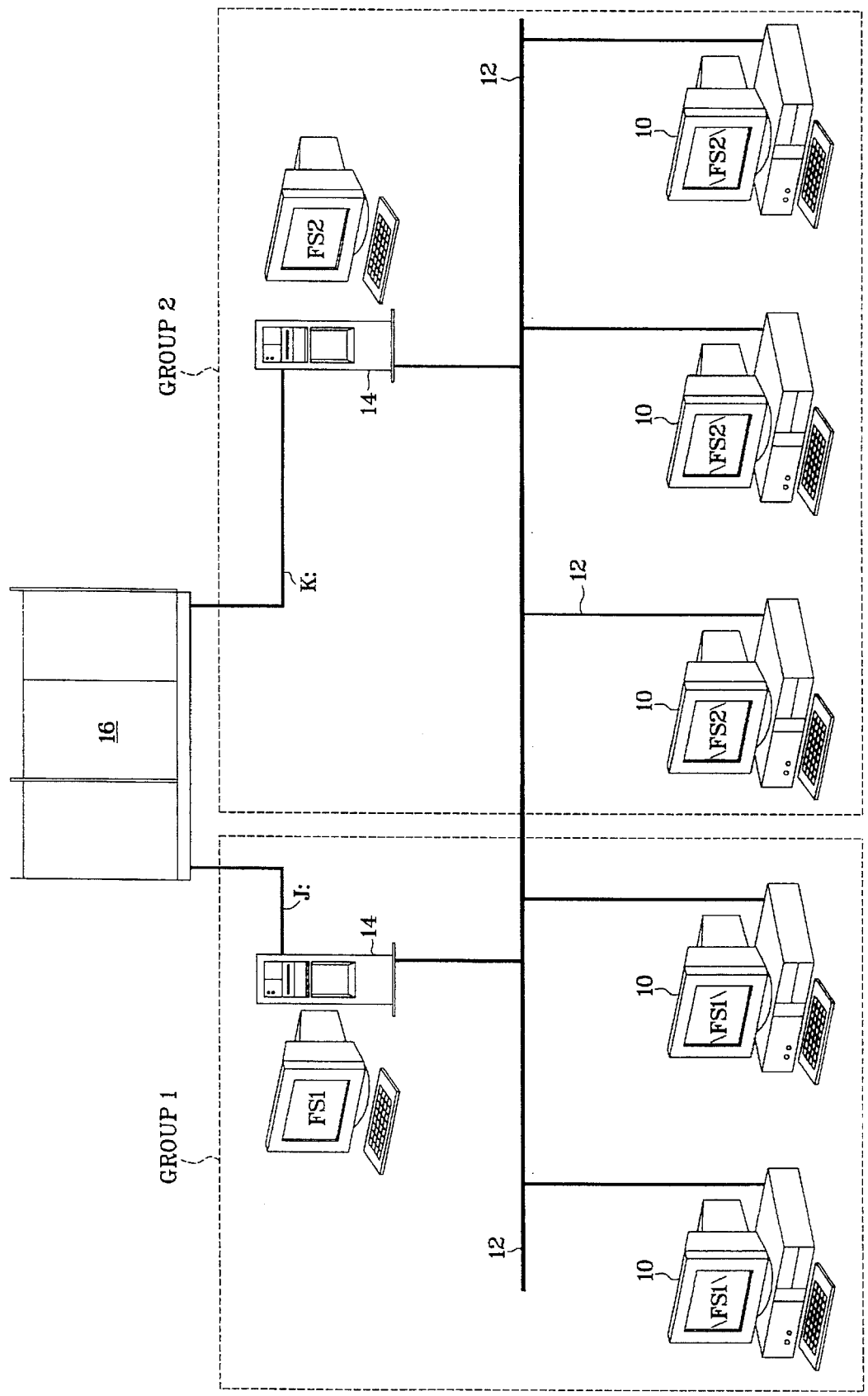
FIG. 1, is a schematic representation of a level-three fault tolerant computer network according to the invention.

As at the 1994 date of this continuation application, customary data-loss prevention methods implemented on a system-wide basis rely upon the creation of a secondary data image, or data mirror which second image can be made available to users if they should lose availability of the primary data image. Systems such as tape back-ups, continual background backups and other means of replicating closed files have been developed primarily to "protect" data from failure of data-storage devices.

Server fault tolerant systems, such as Novell, Inc.'s (see the Major et al. patent) or the workstation-based software-mirroring systems of the parent application, enable users to employ a second file server to continue working with their data in mirrored form on a secondary drive. Creation of a secondary data image, physically separated from mishaps befalling the primary drive's associated hardware is an essential concept of these known server fault tolerant systems.

This invention recognizes that failure of a server supporting a storage device does not imply loss of stored data. Users may simply be unable to access that data, being isolated therefrom by an interruption in the signal pathway thereto. Recognizing also that there now exist highly reliable data storage devices, the invention provides an alternative signal pathway to the principal drive. The pathway includes alternative drive-processing and support means so that users can continue to work with stored data in spite of failure of the primary computing or central processor system supporting that drive. As described above, the invention also provides differentiated addressing of the principal drive and workstation loaded drive-request redirection means to switch or re-route drive requests through another active server.

The principal data-storage device is preferably a sophisticated device having, or associated with, its own fault tolerant systems permitting it to survive, inter alia, power interruptions and limited storage media failures. Examples of such systems employable in preferred embodiments of the invention are static RAM or flash memory storage devices which are expensive but are entirely electronic and have no moving parts and, more commonly, a "RAID" drive. RAID drives usually have many gigabytes of storage capacity, with various levels of redundancy and are managed by built-in, dedicated processors with associated memory and services. Automatic provision of a "hot spare" drive or drives enables the RAID system to sustain failure of an individual drive without loss of data. Data images are automatically rebuilt on replacement drives, without down time.

The parent application discloses a novel system of drive-request redirection, or data storage routing, which method is now claimed herein and enables users to be automatically redirected from one drive to another at the system level, or the system interface level, when access to a primary drive or data storage system is lost, so that redirection proceeds transparently to the user and independently of any application that might be running.

By using similarly configured software at all relevant workstations (i.e. those using or having data-changing access to the primary data set) to ensure that all such workstations similarly redirect their writes to the same new address, data integrity can be maintained without significant risk of the loss of a data element. By reading drive-request returns and responding appropriately to bad returns, the data set condition can be monitored and its integrity maintained. This approach optimizes reliance upon existing workstation or network operating system functionalities and reduces the need for the creation of novel and therefore uncertain capabilities to manage server-to-server communications which is necessary in systems that try to monitor the condition of a primary file server and the network access pathways it supports by means of a second file server. This aspect of the parent invention is further described hereinbelow and newly claimed in the appended claims.

By delegating responsibility for detection of access failure and redirection to all relevant workstations the invention enables network events after a failure to be system controlled. Instead of attempting to effect an instant switchover centrally, between the file servers, the invention controls network traffic at its source, the workstation. Each workstation in turn, and in its own time according to when it attempts to access the relevant storage device via the failed route, pauses briefly as it is automatically reconfigured to redirect storage device accesses via an alternative route.

A further problem solved by the invention is the problem of enabling workstation software to effect a redirection of data-related activity. Data packets labeled with a J: address are recognized by the network shell at the issuing work station, and routed to the relevant drive, J:, via the supporting file server. If the file server goes off line, there is no way to reach the principal logical drive, even though that drive might be physically supported by a second file server.

The problem of addressing the principal drive via a second file server is solved by mapping drive access requests to the first and second file servers with different address labels for the same principal drive. Thus, for example, mapping to the first file server might address the principal drive as "J:" and mapping to the second file server might address the same principal drive as "K:". The drive label is in no way an inherent attribute of the drive itself: rather, it is an externally bequeathed descriptor which is relative to the labeling entity and may change according to whether that entity is a supporting file server, a network shell or redirector at a workstation or some other entity.

In the event of a file server failure, each user of that file server is switched by redirection software (running in RAM at their workstation) from the failed server to the remaining one (or from J: to K: for example) thereby routing access to the principal drive through the surviving server and enabling users to continue working without interruption, and most important, without loss of data, without loss of access to their data, or loss of work entrusted to network storage on the principal drive, or loss of any other application-executable files.

By relying upon the fact that relevant network data traffic originates at the workstations, and by distributing rerouting responsibilities to those workstations, the invention enables relevant data traffic to be controlled to the extent desirable to facilitate rerouting. Thus, as stated above, when first accessing network storage after loss of the primary access route, there may be a short pause at each workstation while rerouting procedures run, during which the rerouting software has control of the workstation, preventing premature release of an inappropriately labeled access request to the network. Because relevant data storage access requests are no longer addressed via the primary server route, no transfer management software or hardware is required at or between the servers. Rerouting of relevant network traffic at its source, the workstations, can ensure that all traffic is automatically sent via the secondary file server route, whereupon the secondary file server takes over storage-related processing activities.

Illustrated embodiments

Referring to the drawing, the schematically shown network comprises a plurality of workstations 10, connected via a traditional network cable 12 to two files servers 14, labeled FS1 and FS2. The two file servers 14 are connected to a high-availability data storage system 16 which can comprise a single disk drive but is more preferably a redundant array of inexpensive drives (RAID) system which provides high-capacity, high availability fault-tolerant data storage, as will be described in more detail hereinbelow.

Network cable 12 can run in daisy-chain manner from one node to the next, with a T-connection to each node. Alternatively, the network may include one or more groups of star-configured nodes radiating from a hub, or other suitable configurations of nodes. A node can comprise a workstation 10 or a file server 14 or an entry point (not shown) to another network, such as a gateway or router, as is known to those skilled in the art. The invention is not dependent upon any particular network topology.

Any appropriate means of communicating data or other digitally addressed information from one node to others on the network can serve the function of cable 12. Common embodiments of cable 12 are coaxial cable, twisted pair and fiber optic. Wireless, short- or long-range radio wave links and modem-interfaced telecommunications between nodes are also possible, so long as nodes so linked can reliably communicate digitally addressed information packets between one another. Each node on the network, including nodes constituted by the two file servers 14, has a unique and distinct address.

Commonly, cable 12 interfaces with a node via a network board that processes network communications and localizes them for the node. Some recent computer systems embody this function on the node system's motherboard.

The workstation 10 may be more or less sophisticated, comprising at a minimum a microprocessor with available software to perform intelligent data-processing functions locally, or comprising a more substantial computing or microcomputing system, supporting peripherals such as a data storage device or a printer.

Workstations 10 can be any computer suitable for localized processing, especially those using INTEL®, MOTOROLA®, IBM® or other microprocessors, and includes systems based on other processors, running appropriate operating systems such as DOS, Microsoft Windows, IBM's OS/2, or Apple Computer's Macintosh.

Characteristic of a workstation are the abilities to support an operating system and network interface, to effect local data processing and to output data to, or input data from a user (usually both).

Also included are any other workstation computers and operating systems described in the parent application.

A typical network may have from, say, two-to-five to hundreds of workstations, while a specialist situation can be envisaged where a single workstation drives multiple file servers 14 supporting a single, high availability storage system 16. In many network environments at the date of this application, it is rare to support more than two hundred workstations off a single file server, more users are accommodated in more complex configurations employing multiple primary file servers, as is known to local area network managers and engineers.

File servers 14 can be any suitable microprocessor, mini or mainframe-based system running under one of a variety of operating systems, including Microsoft's MS-DOS, Windows or Windows NT, IBM's PC-DOS, OS/2, AIX or MVS, Novell's DR DOS, Unix, SCO's Xenix, DEC's VAX, VMS and so on. File servers 14, also, for the multiuser aspects of this invention, support a suitable multiuser operating system such as Novell's NETWARE® network operating system and Btrieve® database server system, Artisoft's LANTASTIC®, Banyan's VINES®, Tiara 10Net, Unix, DEC's VAX and including those file server computers and operating systems described in the parent application. Different network operating systems can be used on the two file servers 14, while supporting mirroring, but to support continuous processing after a failure, some greater compatibility between network operating systems may be required and some network operating systems may require identical versions or different user ID#'s.

Data storage system

In a preferred embodiment of the invention, the high availability, random access, data storage system 16 comprises a RAID system capable of supporting multiple hosts, in this case the two file servers 14 shown as FS1 and FS2. Some commercially available RAID technologies are described in "Which RAID Meets The Application?" Computer Technology Review, volume XIV number 2 February 1994. Other suitable storage systems will be known to those skilled in the art and should have sufficient reliability, which can be expressed in terms of data availability or mean time between failures to justify support by multiple, less reliable hosts.

For the purposes of the present invention, it is preferred that each supported host have access to common storage areas and common files stored in the RAID system. The connection between the hosts and the RAID storage system are fast, intimate, bus-type connections quite different from network connections. While a file server may be linked by a network to one or more physically distant drives, for data storage purposes, the distant drives have to be supported by a local computer to process appropriately addressed network data packets, the network connection is relatively slow and simple and is a data highway open to other traffic that has a limited number of data lanes or conductors.

In contrast, desired communication between file server FS1 or FS2, and the RAID system for the purposes of the present invention, is more in the nature of an umbilical cord or an individual, direct, dedicated physical connection via high-speed data link or bus extending between the RAID system and each file server FS1 or FS2. Typically, the RAID-to-server connection operates at the BIOS level directly between the file server's bus or motherboard, for example, via a SCSI interface, and the drives or drive system manager. "SCSI" is an acronym for "small computer systems interface" and is an industry system standard for controlling access to data storage disk drives. Physically, the link is typically a short-distance, terminated, ribbon cable carrying some tens of conductors which is used exclusively for maintaining an intimate, immediate link between the RAID system and the file servers.

Some multi-host supporting RAID systems, for example Data General Corporation's CLARIION (trademark) storage solution, may segregate storage between hosts to prevent common writes to the data storage system. Under the systems of the present invention, data segregation is effected at the workstation, such prevention is not necessary to maintain data integrity and constitutes an impediment to file server fault tolerance. Accordingly, such storage systems, or their managers or controllers are modified, in accordance with the present invention to permit multiple hosts to access data storage in communal fashion with either or any host reading or writing to the same storage areas and files. Depending upon the nature of the means preventing common access, such modification may be effected, for example in the bus management software of the data storage system.

For the purposes of practicing the present invention, multi-host support of a RAID can be provided by employing a suitable controller such as is available from CMD Technology Inc. Prior to the 1994 date of this application, CMD Technology Inc., disclosed, in a publicly available sales brochure, copyrighted 1993, and entitled "CRD-5000 RAID Disk Array Controller" ("the CRD-5000 controller"), an intelligent controller for a RAID system of data storage drives which is capable of supporting multiple hosts computer or file server systems. As disclosed in the CMD Brochure, the CRD-5000 controller has a multiplicity of board-pluggable, host- and device-channel modules for managing the interfaces with supported drives and hosts. The channel modules manage all command and data-processing tasks unique to the respective host or drive. Multiple disk drives of perhaps several hundred megabytes capacity each, are coupled each to their own module, to create a drive array system with a multi-gigabyte storage capacity. The CRD-5000 controller supports up to 28 drives and apparently, each of three host modules can support up to seven hosts, for a total of twenty-one. The CMD-5000 controller is advertised to have a MTBF of 120,000 power-on hours.

A RAID system has been described as being a currently commercially available, best-known embodiment of a high availability random access, data storage system useful in the practice of the present invention, but other data storage systems can be used, including any suitable optical, static or flash memory system having memory elements that retain their state when the storage system is powered down. Desired characteristics for a multi-user centralized storage system are fast access, high capacity and very high reliability. It can be expected that future developments in this fast-paced industry will produce storage systems suitable for the practice of this invention which are based on substantially different technologies from those now available.

Access Routing and System Operation

As shown in FIG. 1, the network is divided or segregated into Group 1 of workstations 10 configured to use file server FS1 to access storage system 16 and Group 2 configured to access storage system 16 via file server FS2. The selection of workstations 10 for Group 1 or Group 2 is preferably made with due regard to the anticipated access traffic they will generate and with regard to the respective processing capabilities of file servers 14, and as indicated above may be made according to application or data type. For example Group 1 may be accounting-bookkeeping stations, while Group 2 engage in text entry or document creation activities.

Group 1 access to data storage device 16 is addressed, or routed at the workstation user interface level by a drive letter such as J:, the J: address is interpreted by the network shell running at the workstation, for a data packet leaving workstation 10 to enter the network, as an address routed via file server FS1 with a mapping path such as \FS1\. Similarly, Group 2 workstation access to storage device 16 is routed via file server FS2 using drive label K: and server mapping path \FS2\. This routing is a network function and, typically, it is coded into the workstation's log-in scripts.

Each workstation 10 loads data-storage routing software to RAM for transparent monitoring of all access requests for storage device 16. Employing setup routines in the routing software, access path J: translating to \FS1\ in the network shell is specified as the primary access route to storage device 16 for Group 1 workstations 10. Access path K: translating to \FS2\ is specified as a secondary access path for Group 1 workstations 10 to be used in the event of failure of the primary access route.

An opposite or complementary access route specification is used for Group 2 workstations, path K:, translating to \FS2\, being specified for primary access and path J:, translating to \FS1\ being specified for secondary access to be used in the event of failure of the primary access route.

Any command line use of a secondary access route specification, prior to primary failure, is automatically converted to a corresponding primary access route, by the inventive rerouting software, in order to maintain the integrity of the secondary access path.

Processing responsibilities for handling the traffic between workstations 10 and storage system 16 are thus shared between file servers FS1 and FS2, optimizing use of these network resources and speeding network response times for data access operations as compared with server fault tolerant configurations employing a duplicate data image supported by a redundant backup file server.

After failure of file server FS1, both workstation groups use file server FS2. Group 1 workstations redirect any access requests routed via file server FS1 to be routed via file server FS2 while Group 2 workstations continue their original routing via file server FS2.

Write-only mirroring

Assuming FS1 and FS2 have roughly equivalent processing power, significant gains in processing throughput, as compared with the throughput managed by a single file server of similar capacity, can be achieved by mirroring, or replicating, write but not read requests. In this way, processing read traffic, which is often a major part of network activity can be shared between processors. Preferably, and this feature may modestly reduce the processing gains, a read request for the secondary is replicated in the network shell, but the read request is not output to the network to add to network traffic, and read data is not sent back to the workstations. This "positions the pointer" or primes the system to be ready promptly to execute a read command redirected from the primary as a result of primary failure. The desired data can then be quickly accessed via the secondary using secondary route mapping stored in the network shell.

Cross-mirroring

The term "cross-mirroring" can be used for the above-described mode of server fault-tolerant network operation in which summed workstation storage activity is divided into first and second (or more) categories, the first category being routed through a primary file server and the second category being routed through the secondary with automatic rerouting of relevant workstation storage activity via the other server in the event of loss of access via one of the servers.

Cross-mirroring without secondary writes

The concept of "positioning the pointer" without actually executing a storage device access request can be extended to situations where multiple servers cross-mirror, and support a communal high availability storage device. Write traffic need not be mirrored, or replicated, via the secondary, because maintenance of an accessible data image is delegated to the high availability storage device and the invention, as set forth in the preferred embodiments disclosed herein, focusses on providing the workstations with access path redundancy to that data image, so that no duplicate image has to be generated across the network. Accordingly, the response to a good primary return is not replication via the secondary, but is preferably a "positioning of the pointer" as described for reads. With this innovation, server fault tolerance, employing multiple file servers, can be attained without increasing network traffic.

Where writes via a secondary route are not output to the network, action may be desirable to monitor the status of the secondary access route, to alert a network supervisor or network users to its loss and to avoid attempts to reroute via the secondary. Such action may be effected by having the inventive rerouting software poll the secondary in a time or function-dependent manner (for example every 10 or 20 database reads), by sending a low-impact storage-device access request via the secondary, for example, a FAT table request, or a GET NEXT, or GET FIRST, preferably activating a non-critical area of operating system code.

Workstation-servers

On certain small networks, for example peer-to-peer networks a file server supporting shared storage can also function as an on-line workstation accessing that storage, a "workstation-file server". In such a situation, level three fault tolerance can be economically provided without requiring the full incremental cost of a passive, backup file server.

Duplicate data images can be maintained, one on each of two such workstation-file servers, reflecting all relevant data-write activity on the network including writes emanating from the workstation-file servers. This system is of value in many smaller environments, for example, to run cash registers in a point of sale environment. In an exemplary embodiment, a back room terminal may provide primary storage and support administrative workstation activities while a cash terminal up front supports storage of a secondary data image and posts sales.

Dividing the network lead

As described above, the network processing load can be divided between file servers FS1 and FS2 in a number of ways, by workstation, as shown in FIG. 1, or by application or file usage. An alternative division of load can be effected according to the need of individual users for read or read-and-write access.

Files shared by multiple network users should preferably be separately accessed via one server or the other, but not by both, although there are ways, to be described, to manage dual server access of a shared file. Shared access is normally managed by using access locks which prevent multiple users from writing independent changes to the shared file and ensure that all write activity is cumulative. Under the ubiquitous Novell NETWARE (trademark) network operating system, information as to the lock status of files is maintained on the server providing storage access, in a lock table.

If access to a shared file is required to be available to the workstations via both or either server, lock table integrity can be maintained for example by permitting only read-only access to the file via one of the servers. Alternatively, the lock table may be maintained on the high-availability storage device to be accessible to both servers.

Software sequence

Figure 2:
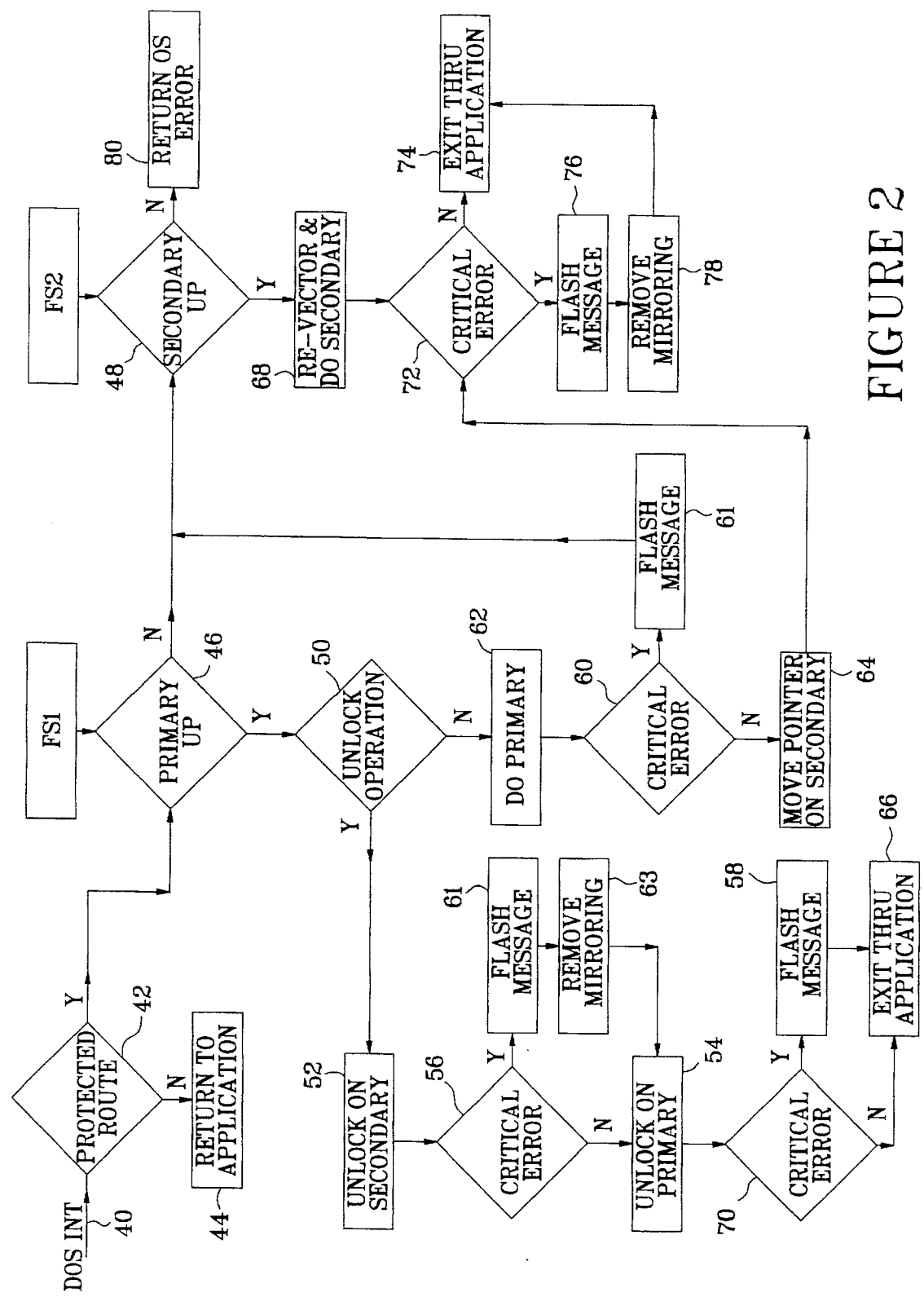
FIG. 2 is a schematic block flow diagram of a data-storage routing software embodiment of the invention.

Referring to the block flow diagram of FIG. 2, which indicates schematically one possible software processing sequence according to the invention, as it may be executed at a workstation on a server-redundant network, or at a client of multiple servers, a data-related, routed, drive request from an application is intercepted via a suitable workstation operating system interrupt 40, for example, DOS interrupt 21. Protected route query 42 checks whether the requested drive route was specified for monitoring at initialization of the inventive data-access protection software.

There are three possibilities:

i) If the requested drive route was not specified at initialization, i.e. the requested drive was not selected for mirroring or for access protection, an application return 44 is processed and normal processing continues as though the inventive data-access protection software were not installed.

ii) If the requested drive route was specified at initialization, as a primary drive route to be protected by establishing a secondary drive route, processing proceeds to primary check 46.

iii) If the requested drive route was specified at initialization as a secondary drive route, the request is relabeled for the corresponding primary route and processed according to ii).

Primary check 46 looks at a memory register to determine whether the requested drive route is a valid network address. If desired, primary check 46 also checks for previous information about the status of the primary drive access route through file server FS1.

If primary check 46 issues a no indicating the network address is not valid, or is no longer good, processing continues with an attempt to service the primary-routed drive request by redirecting it to be routed via the secondary file server FS2, commencing with secondary check 48.

If primary check 46 issues a yes, the primary route is good, then attempts are made to service the request via the primary server FS1, beginning with an unlock operation query 50.

It is appropriate to emphasize that the inventive software perceives the network strictly from the perspective of an individual workstation on a network. That workstation may, and probably will, have no information as to the status of any other network entity, other than information received by the workstation as workstation-addressed packets off the network data highway. Therefore, the inventive data-access protection software makes no assumptions as to the status of either file server, but merely attempts to use each in turn according to the software protocols, monitors responses for confirmation of fulfilled requests, and responds conservatively to any negative information received off the network.

After determining the primary route is good, preparatory to completing a primary access, unlock operation query 50 checks whether the drive request is for an unlock operation. If unlock operation query 50 outputs a yes, then unlocking proceeds, pursuant to the principles set forth in Tims et al. patent application Ser. No. 08/044,323, along the left branch of FIG. 2. The unlock operation begins with secondary unlock 52, and follows with primary route unlock 54, if critical error check 56 of the return received from secondary route unlock 52 is negative.

If critical error check 56 of the secondary unlock finds a bad return, alerting message 61 is flashed, or stored centrally, a remove mirror operation 63 is executed and unlocking of the primary proceeds.

Assuming critical error check 70 of the primary unlock yields a no, the inventive data-access protection software exits through the application at 66. If a critical error is detected, message 58 is flashed prior to exiting through the application. The application may then issue a new request, or requests, for example a primary drive write, reactivating the inventive data-access protection software.

In the event that unlock operation query 50 determines that no unlock operation is necessary, do primary 62 is executed, sending the request via the primary route. If critical error handler 60 detects a bad return indicating an unrecoverable problem executing the desired drive request via the specified primary route maintained by file server FS1 (for example, the file server has crashed), an alerting message 63 such as "Primary route failed. Processing continued via the secondary" is flashed to the workstation operator, or reported centrally, or both. The access through primary server FS1 having failed, the inventive drive-access protection software relabels the request to route it through secondary file server FS2, commencing with the secondary check 48. Otherwise, at completion of the do primary 62, as confirmed by a good return, processing advances to secondary pointer mover 64.

Secondary pointer mover 64 shadows movement of the primary pointer within the shell or redirector in the workstation. Movement of the secondary pointer, synchronously with the primary, ensures that the secondary route is primed with a relevant pointer poised immediately to assume processing responsibilities in the event of loss of drive access via the primary. This function assures a smooth transition, providing for continuous processing on a network, after loss of a data-storage access route, in a manner that can be completely transparent to workstation users, and requires, at most, an optional on-screen user alert and single-entry choice of action after such loss.

Preferably, secondary pointer mover 64 positions a relevant drive head, or the like, or is initialized, as just described, but does not complete the drive request by reading or writing data, or other such time consuming function. This provision minimizes the work load on secondary file server FS2, relieving it not only of duplicate read activity, which is pointless, but also of duplicate write activity and enabling the secondary server to perform other tasks.

Duplicated writes, or data-changing requests are necessary for the fault-tolerant objectives of the invention insofar as they are achieved by systems employing a replicated data image. However, where a high-availability data storage system, equipped with its own levels of device redundancy is employed, as described herein, no such duplicate data image is required. Accordingly, the secondary file server can be relieved of drive-request execution functions, and make processing capacity available to the network. Nevertheless, a "good" or "bad" drive status is reported back to the workstation, keeping the workstation posted as to the availability of the drive via the specified secondary route, and a critical error check 72 is made.

Pursuant to the teachings of the present invention, secondary server FS2 can, processing capacity permitting, also function in primary server mode for a different group of network addresses from those for which server FS1 functions as a primary.

If critical error check 72 finds no error, as indicated by a good return from the secondary route, the inventive data-access protection software exits through the application at 74, a round of paired drive requests having been satisfactorily completed, and control of processing is returned to the application (which may include the operating system, should the workstation user have been interfacing with the operating system to generate the relevant drive access request).

If critical error check 72 detects a bad return, "Y", alerting message 76 is flashed or stored centrally reporting loss of the secondary route, remove mirroring 78 is executed and exit through the application 74 is executed. Mirroring, or access replication via the failed secondary route is halted and processing continues via the primary route, in unprotected mode until the secondary route is restored and systems are reset.

Referring back to primary route failure, as detected by a negative from primary check 46 or critical error handler 60, secondary check 48 is now made. If secondary check 48 yields a good return, confirming the relevant data image is available via the secondary route maintained by file server FS2, storage request redirector 68 takes over system control, re-vectors any of a specified group of primary route storage requests and executes a do secondary to send the request via the secondary route. Critical error check 72 examines the return and executes exit through application 74, with removal of mirroring if a critical error is detected, as described above.

If secondary 48 issues a negative, "N", indicating that the secondary access route, as well as the primary access route has failed, an error report 80 is sent to the operating system which will advise the user or application, of the unavailability of the requested data.

In multiple redundancy embodiments of the invention, instead of returning error report 80 to the operating system, the inventive routing software continues to pursue access to the desired data via a tertiary access route and any other data access routes that may have been provided.

Further benefits of the invention

A great practical benefit of the invention is that computer networks having a multi-host supportable storage drive when they begin to suffer file server bottlenecks as network traffic grows over time, can be readily and economically upgraded, and at the same time gain server fault tolerance, simply by adding a new file server and employing workstation-loaded routing software, as described herein. The feature of secondary write suppression, described above, in conjunction with multi-host support of a communal or single high-availability storage device enables a new file server's capacity to be added to that of the old, while at the same time providing server fault tolerance.

Typical high-availability storage devices are usually high capacity, and can be considerably more expensive than a file server. In such environments, the value of the present invention can hardly be exaggerated. Prior to the present invention, known methods for providing server fault tolerance required the addition to the network of a duplicate drive of comparable data capacity. Added to the need for a secondary server and enabling fault tolerant software the total cost of server fault tolerance was very substantial. In contrast, besides fault tolerant enabling software, the present invention requires only a multi-host capability for the storage device in order to harness the processing power of both the primary and secondary servers for normal network processing duties. Large cost savings in implementing server fault tolerance are thereby obtained.

While some embodiments of the invention have been described herein by way of example, the invention is not limited to such embodiments, but other embodiments will occur to those skilled in the art as serving the purposes of the invention and such other embodiments may have equivalents to the structures, elements and methods of the invention that have been described herein.

We claim:

1. A fault-tolerant computer network comprising:
   a) a high availability permanent data-storage device maintaining a data image;
   b) primary and secondary intelligent network hosts connected to and supporting said storage device;
   c) multiple data-processing workstation connected in a local area network with both said hosts to access said data image maintained on said high-availability storage device via each said intelligent host independently; and
   d) data-storage routing software loadable at said workstations and providing, for each said workstation, primary route addressing and secondary route addressing of said data image maintained on said high availability storage device via said primary or said secondary host respectively; wherein said data-storage routing software comprises:

i) monitoring means to monitor data storage activities output from said workstation onto said computer network and to detect failure to access said high-availability storage device via a respective one of said intelligent hosts and ii) rerouting data access requests for said high-availability storage device via a respective other of said intelligent hosts hosting said dam storage device in response to said access failure detection;

whereby workstation access to said dam image maintained on said high-availability storage device can continue transparently to the user despite loss of functionality of one of said intelligent hosts.

2. A fault-tolerant computer network according to claim 1 wherein said data-storage routing software monitoring means monitors operating system activity and interrupts data-related storage requests for said high-reliability storage device.

3. A fault-tolerant computer network according to claim 1 wherein said primary and secondary hosts can both write to common data storage areas on said high-availability data storage device.

4. A fault-tolerant computer system according to claim 1 wherein said high-availability data-storage device comprises a redundant array of inexpensive drives.

5. A fault-tolerant computer system according to claim 1 comprising a bus connecting each said host to said high-availability data-storage device.

6. A fault-tolerant computer system according to claim 1 comprising a number of workstations of from two to two hundred each connected for networked communication with said primary and secondary hosts under control of a network operating system.

7. A fault-tolerant computer system according to claim 6 wherein use of said high-availability storage device is divided between said intelligent hosts whereby said intelligent hosts share network processing duties relating to access of said high-availability storage device.

8. A fault-tolerant computer system according to claim 7 wherein said routing software comprises a setup protocol to effect division of use of said high-availability storage device by segregating said workstations into a first group routing access to said high availability storage device via said primary host and a second group routing access to said high availability storage device via said secondary host.

9. A fault-tolerant computer system according to claim 7 wherein said routing software comprises a setup protocol to effect division of use of said high-availability storage device by segregating said workstation activity into a first class of activity related to a first shared data type and into a second class of activity related to a second data type, said first class of data activity being routed via said primary intelligent host and said second class of data activity being routed via said secondary host.

10. A computer network management method for a local area computer network employing a data storage device maintaining a data image and capable of being supported by multiple intelligent network. hosts, said method comprising:

a) coupling at least a primary and a secondary intelligent host to said storage device in a local area network for access of said data image by multiple workstations via either one of said primary and secondary hosts; and b) employing workstation loaded routing software at each said workstation, said routing software performing the functions of:

i) routing all workstation generated network data storage activity destined for said storage device to be segregated between first and second file categories for storage on said storage device through said primary and said secondary intelligent hosts respectively whereby, said intelligent hosts share data storage activities providing network access to said data storage device;

ii) monitoring means to monitor data storage activities output from said workstation onto said computer network and to detect failure to access said high-availability storage device via a respective one of said intelligent hosts; and iii) rerouting data access requests for said high-availability storage device via a respective other of said intelligent hosts hosting said data storage device in response to said access failure detection;

whereby workstation access to said high-availability storage device can continue transparently to the user despite loss of functionality of one of said intelligent hosts.

11. A computer network management method according to claim 10 comprising routing all said workstation generated data storage activity via said primary intelligent host, performing maintenance or upgrade service functions on said secondary intelligent host, and rerouting data storage activity to be divided between said intelligent hosts after said service functions are completed.

12. A computer network management method employing on a computer network, a data storage device capable of being supported by multiple intelligent hosts, said method comprising:

a) coupling at least a primary and a secondary intelligent host to said storage device for access by one or more workstations; and b) employing workstation loaded routing software said routing software performing the functions of:

i) routing all workstation generated network data storage activity destined for said storage device to be segregated between first and second file categories for storage on said storage device through said primary and said secondary intelligent hosts respectively whereby, said intelligent hosts share data storage activities providing network access to said data storage device;

ii) monitoring means to monitor data storage activities output from said workstation onto said computer network and to detect failure to access said high-availability storage device via a respective one of said intelligent hosts and iii) rerouting data access requests for said high-availability storage device via a respective other of said intelligent hosts hosting said data storage device in response to said access failure detection;

whereby workstation access to said high-availability storage device can continue transparently to the user despite failure of one of said intelligent hosts.

13. A method according to claim 12 comprising physically connecting both intelligent hosts to a single high-availability, random-access, data-storage device to support access of multiple workstation users, each said workstation being loaded with software responsive to loss of activity of either active intelligent host to redirect data-related communication of said users with said commonly supported high-availability randomaccess data-storage device to be supported by the remaining active intelligent host.

14. A method according to claim 13 wherein said data storage device is a high availability multi-host supportable RAID drive.

15. A computer network workstation being one of a number of such workstations connected via a local area network with a primary file server providing access to a data image supported on a network data storage system, connected to a secondary file server to provide an alternative storage system access path loaded with rerouting software for providing redundant data accessibility across the local area network, said rerouting software performing the steps of:

a) monitoring all data output by said workstation to a primary server-supported network data storage system maintaining a data image;

b) detecting at said workstation failure to access said data storage system via said primary server; and c) rerouting workstation-generated data storage activity to a current version of said data image via the secondary file server and the alternative storage system access path.

16. A computer network workstation according to claim 15 wherein said detection of access failure is effected by monitoring returns from said data storage system to said workstation.

17. A computer network workstation according to claim 15 wherein said a storage system access request is held in workstation RAM and rerouted in response to a bad return.

18. A computer network according to claim 15 having said rerouting software implemented at all network workstations using a specified shared data set, to effect similar data storage routing at each said workstation, to ensure data integrity.

19. A fault-tolerant computer network according to claim 1 wherein said rerouting software converts a command line secondary access route specification, prior to primary failure, to a corresponding primary access route specification.

20. A fault-tolerant computer network according to claim 10 wherein said rerouting software converts a command line secondary access route specification, prior to primary failure, to a corresponding primary access route specification.

* * * * *